US008136855B2

(12) United States Patent
Toneatti et al.

(10) Patent No.: US 8,136,855 B2
(45) Date of Patent: Mar. 20, 2012

(54) VEHICLE BUMPER ASSEMBLY AND ASSOCIATED VEHICLE COMPRISING THIS BUMPER ASSEMBLY

(75) Inventors: Jean Louis Toneatti, Milan (IT); Mario Vismara, Casatenovo Lc (IT)

(73) Assignee: VM Plastics S.R.L., Naples (IT)

( * ) Notice: Subject to any disclaimer, the term of this patent is extended or adjusted under 35 U.S.C. 154(b) by 0 days.

(21) Appl. No.: 12/582,219

(22) Filed: Oct. 20, 2009

(65) Prior Publication Data

US 2010/0038923 A1 Feb. 18, 2010

Related U.S. Application Data

(62) Division of application No. 11/747,810, filed on May 11, 2007, now Pat. No. 7,625,022.

(30) Foreign Application Priority Data

May 17, 2006 (IT) .............................. MI2006A0970

(51) Int. Cl.
*B60R 19/18* (2006.01)
*B60R 19/24* (2006.01)
(52) U.S. Cl. ........................................ 293/133; 293/155
(58) Field of Classification Search .......... 293/120–121, 293/109, 155, 133
See application file for complete search history.

(56) References Cited

U.S. PATENT DOCUMENTS

| 4,533,166 A | 8/1985 | Stokes |
| 4,762,352 A | 8/1988 | Enomoto |
| 4,941,701 A | 7/1990 | Loren |
| 4,971,376 A * | 11/1990 | Eipper et al. ................... 293/132 |
| 5,122,398 A | 6/1992 | Seiler et al. |
| 5,139,297 A | 8/1992 | Carpenter et al. |
| 6,371,540 B1 * | 4/2002 | Campanella et al. ......... 293/102 |
| 7,093,866 B2 | 8/2006 | Toneatti et al. |
| 2004/0145195 A1 | 7/2004 | Mooijman et al. |
| 2005/0062300 A1 | 3/2005 | Toneatti et al. |

FOREIGN PATENT DOCUMENTS

| EP | 0 323 038 A2 | 7/1989 |
| EP | 0 425 923 A1 | 5/1991 |
| EP | 1 504 966 A1 | 2/2005 |
| WO | 03/080398 A1 | 10/2003 |

* cited by examiner

*Primary Examiner* — Dennis Pedder
(74) *Attorney, Agent, or Firm* — Nixon & Vanderhye, P.C.

(57) ABSTRACT

A bumper assembly for a vehicle and the associated vehicle comprising this bumper assembly are described. The vehicle comprises a chassis. The bumper assembly comprises: a bumper core. The bumper core, in turn, comprises: a first cross member made of a first thermoplastic material and a first and a second substantially undeformable connection device for rigidly fixing the first cross member to the chassis of the vehicle. The first and the second substantially undeformable connection devices co-operate with the first cross member. The bumper core also comprises a second cross member and at least one shock absorbing element arranged between the first cross member and the second cross member. The second cross member is connected to said first and second substantially undeformable connection devices or it is formed as one piece with said substantially undeformable connection devices.

23 Claims, 6 Drawing Sheets

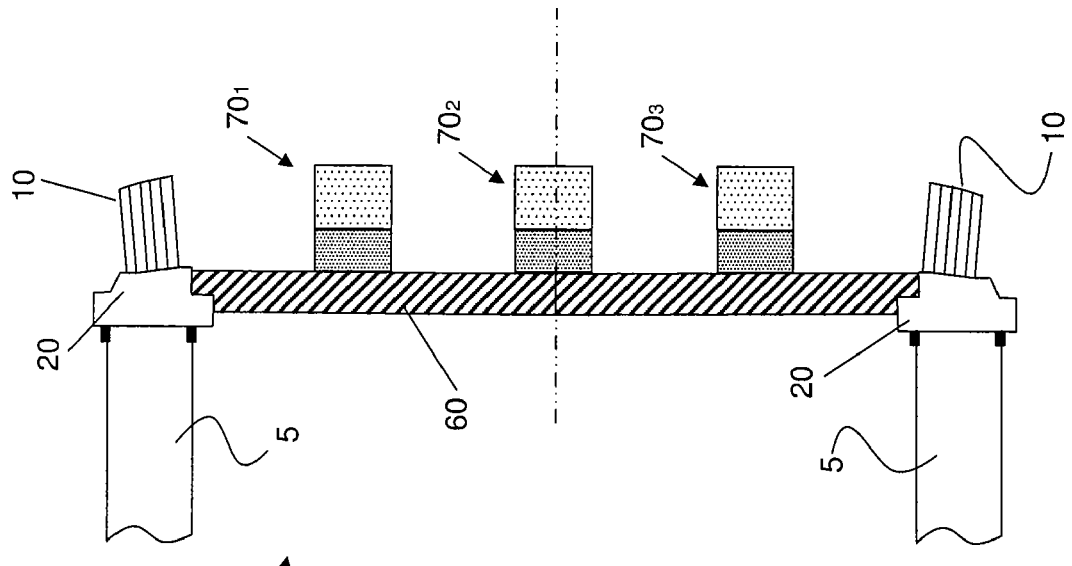
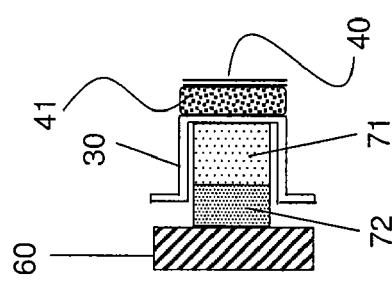
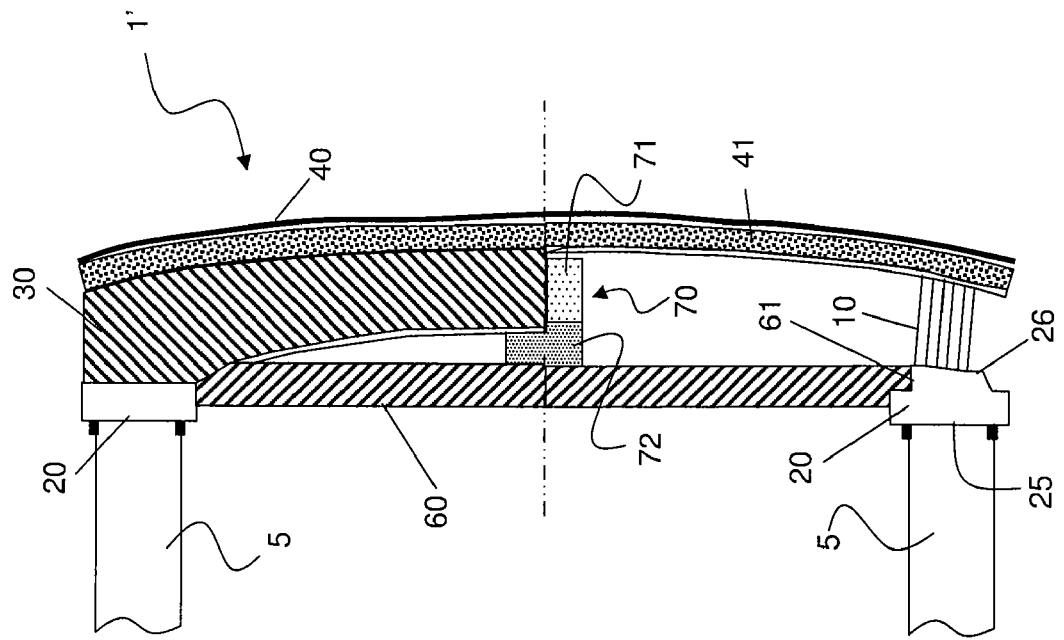

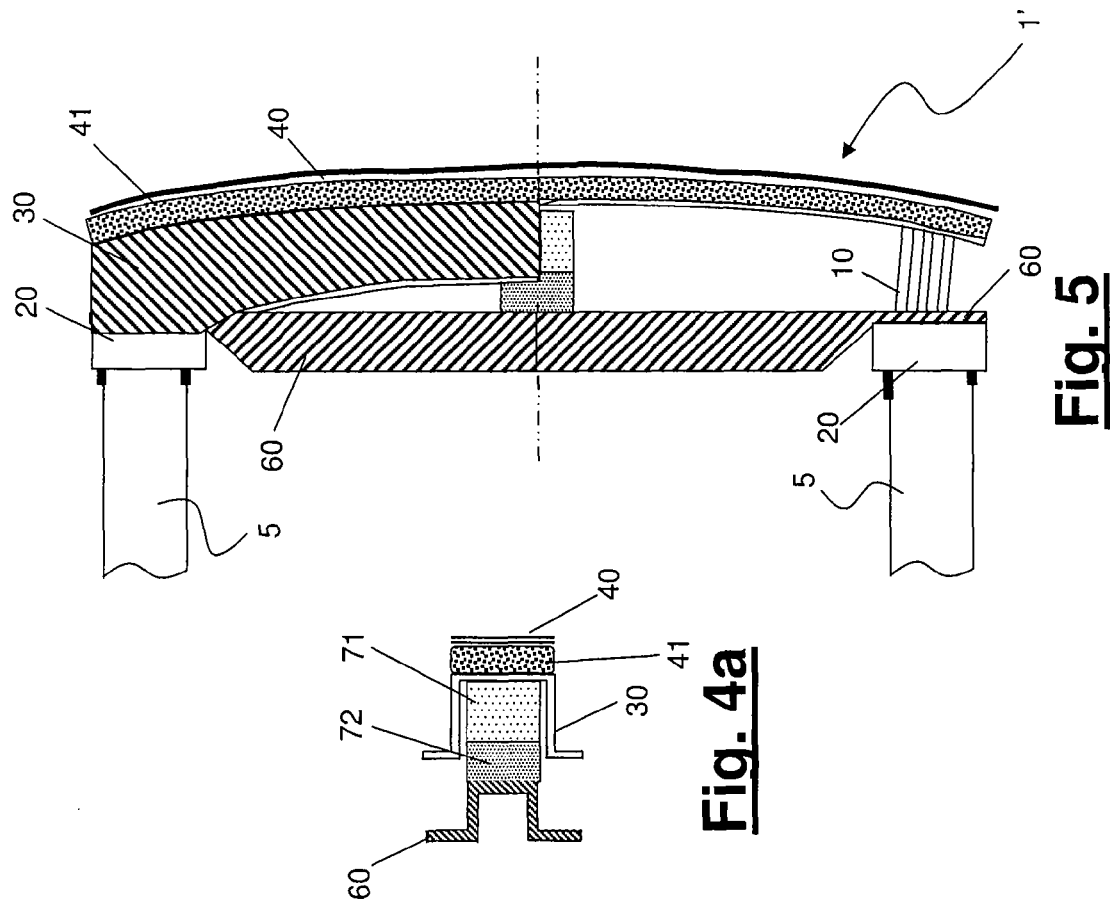
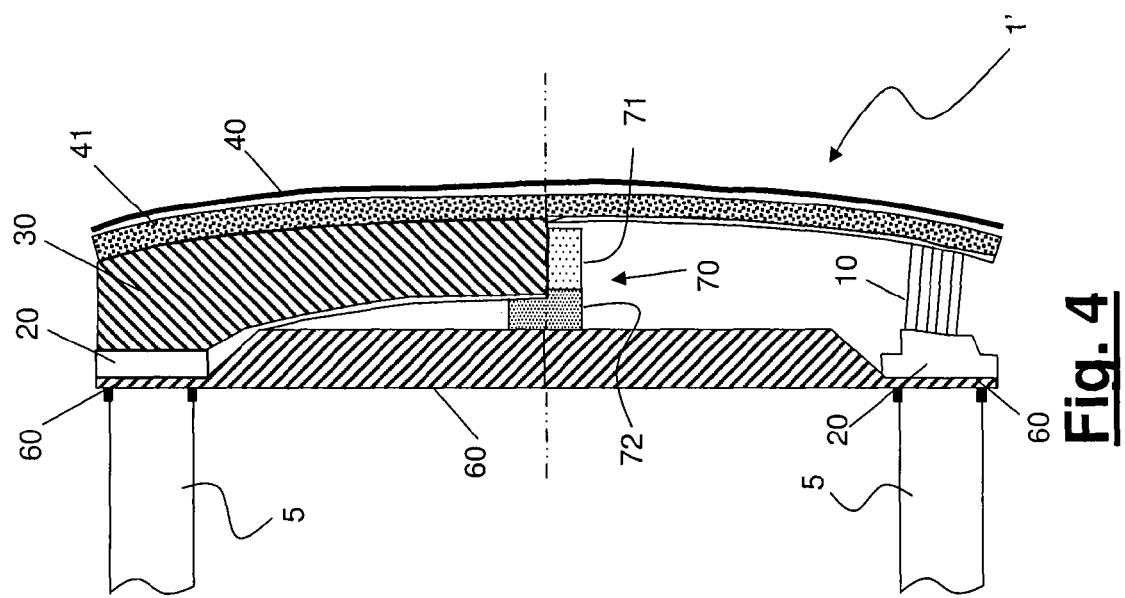

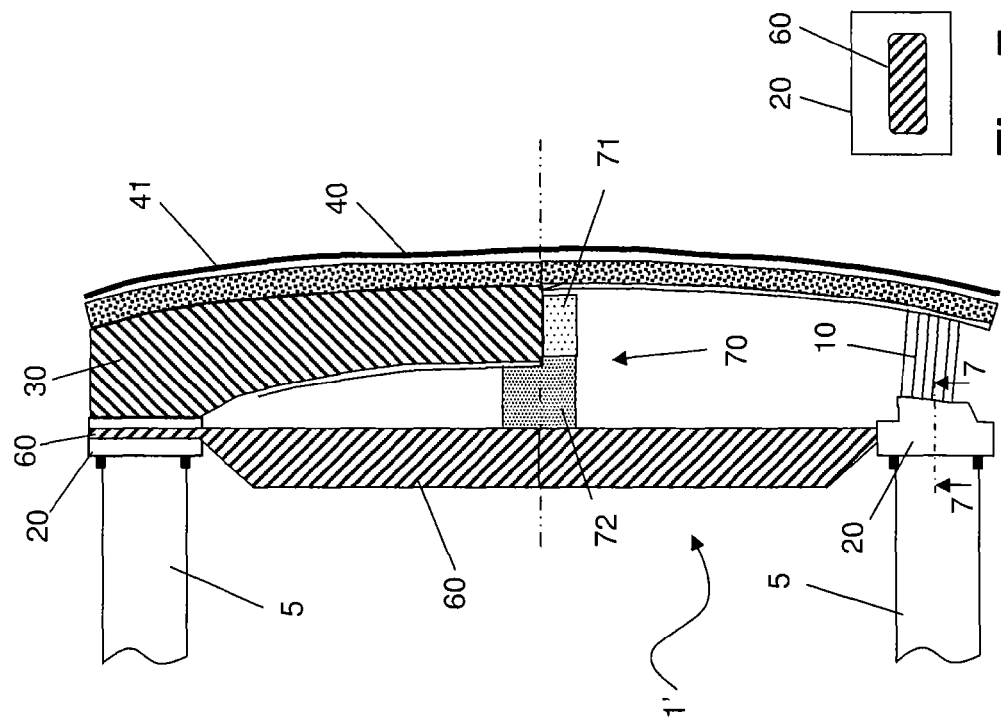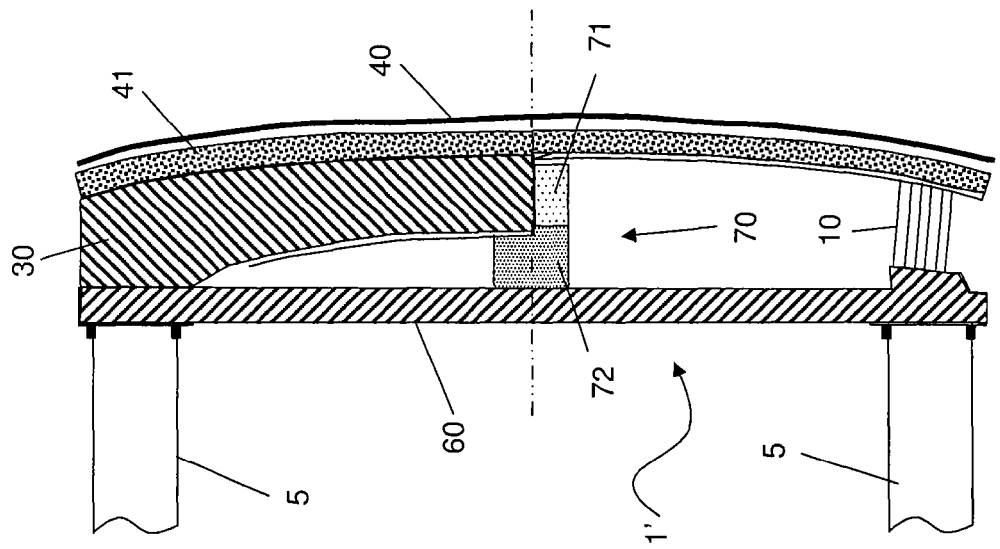

VEHICLE BUMPER ASSEMBLY AND ASSOCIATED VEHICLE COMPRISING THIS BUMPER ASSEMBLY

CROSS REFERENCE TO PRIOR APPLICATION

This application is a divisional of U.S. patent application Ser. No. 11/747,810, filed May 11, 2007, which claims priority from Italian Patent Application Serial No. MI2006A 000970, filed May 17, 2006, both of which are incorporated by reference herein.

BACKGROUND OF THE INVENTION

1. Field of the Invention

The present invention relates to the cushioning of energy produced by impacts on vehicles and in particular relates to an improved bumper assembly for vehicles, as well as a vehicle comprising this bumper assembly.

2. Related Art and Other Considerations

It is known in the motor vehicle industry that bumpers are provided at the front and at the rear of a vehicle in order to absorb the impact energy and limit as far as possible any injury to passengers or pedestrians who may be involved in the impact, as well as damage to the vehicle parts.

At present, a vehicle, in order to be type-approved, is subject to so-called "crash tests". These crash tests may be divided up, depending on the type of impact, into different categories. Moreover, there exist different regulations for the same impact category when type-approving a vehicle in Europe or in North America (Canada and the USA). The biggest difference between the regulations exists in the fact that, in order to obtain type-approval in North America, the vehicle must pass tests at a higher speed than the speed stipulated by the European regulations (generally substantially twice said speed). The speed of the longitudinal impact test stipulated in paragraph 2.7 of the standards for vehicle type-approval in Europe ["Agreement concerning the adoption of uniform conditions of approval and reciprocal recognition of approval for motor vehicle equipment and parts", reached in Geneva on 20 Mar. 1958, Addendum 41, Regulation No. 42, "Uniform provisions concerning the approval of vehicles with regard to their front and rear protective devices"], referred to below in short as "ECE 42", is 4 km/h. The corresponding test speed stipulated by the Regulations TP-581-01 (25 Apr. 1990) issued by the U.S. Department of Transportation National Highway Traffic Safety Administration" (for type-approval in the USA) or that envisaged for type-approval in Canada by Standard 215 of the Motor Vehicle Safety Act, Motor Vehicle Safety Regulations", is about 8 km/h.

Many vehicle manufacturers design and construct vehicles both for the European market and for the North American market.

If a vehicle is originally designed for the European market, the manufacturer envisages a bumper assembly which is able to satisfy the abovementioned European standard. However, it is highly probable that this bumper assembly will not be sufficient for the vehicle to pass successfully the crash tests envisaged by the North American standards. The manufacturer must therefore make certain adaptations. These adaptations usually consist in increasing the thickness of the layer of cushioning material. In this way, the bumper assembly protrudes by a greater amount from the shape of the vehicle and modifies the dimensions, the aerodynamics and the aesthetic appearance thereof. If the manufacturer is unable (or does not wish) to modify the shape of the vehicle, the cross member to which the layer of cushioning material is fastened must be greatly reinforced (i.e. the same cross member may not be mounted).

If, on the other hand, a vehicle is originally designed for the North American market, the manufacturer envisages a bumper assembly suitable for complying with the abovementioned North American standard. This bumper assembly will project greatly from the shape of the vehicle since it will have a fairly thick layer of cushioning material. This results in an unacceptable increase in the dimensions of the vehicle, negative aerodynamic characteristics and, very often, an unattractive aesthetic appearance when marketing the vehicle in the European market.

EP 0 323 038 A (LADNEY, MICHAEL, JR) discloses a vehicle bumper structure having a body secured to the vehicle and a resiliently deformable fascia spaced forwardly of the bumper structure. The volume defined therebetween is filled with an integral skin urethane foam that is resiliently deformable and integrally bonded to both members. The body includes a beam having an upper flange and a lower flange. The fascia is connected to the body at the upper flange thereof but it is not secured to the column rails of the vehicle. The fascia mainly has aesthetic purposes and can act against very small entity crashes. The arrangement of EP 0 323 038 A is unable to be adapted so as to allow compliance with various regulations without an increase in the length of the vehicles.

EP 1 504 966 A (ADLEV S. R. L.) discloses a bumper assembly for a vehicle comprising: at least two crash boxes; a cross member made of a first plastic material which, during use, extends over a distance at least corresponding to that between the crash boxes; and at least two substantially indeformable connecting devices connected to said cross member for rigidly fixing said cross member to a vehicle chassis, wherein said at least two substantially indeformable connecting devices are connected to the cross member at positions corresponding to the crash boxes. A bumper shield or fascia is also provided for aesthetic purposes. Typically, the bumper shield is connected to the body shell of the vehicle. When it crashes against an obstacle, it gets deformed and transmits such deformation to the body shell of the vehicle. The arrangement of EP 1 504 966 A is unable to be adapted so as to allow compliance with various regulations without an increase in the length of the vehicles.

EP 0 425 923 A (BASF AKTIENGESELLSCHAFT) discloses a recyclable polypropylene-based bumper system comprising a bumper support comprising glass fibre-reinforced polypropylene, an energy-absorbing foam core comprising foamed polypropylene, and a tough shell which comprises EP rubber-modified polypropylene and may, if desired, be painted. The bumper system can be recycled by mechanical comminution, extrusion and granulation. The granules can be used to produce injection mouldings having good mechanical properties. The bumper system of EP 0 425 923 A corresponds to a single cross member (bumper support) and fascia (shell) arrangement with foam therebetween. The bumper support is connected to the shell at upper and lower flanges of the bumper support. The arrangement of EP 0 425 923 A is unable to be adapted so as to allow compliance with various regulations without an increase in the length of the vehicles.

US 2004/145195 A1 (MOOIJMAN FRANK ET AL) discloses a bumper assembly for an automotive vehicle. In an example embodiment, the assembly comprises a beam and an injection molded energy absorber secured to the beam. The energy absorber comprises at least one crash can. The assembly further comprises a fascia for covering the beam and the energy absorber. The fascia seems to be configured for being connected to the body shell of the vehicle. The arrangement of US 2004/145195 A1 is unable to be adapted so as to allow compliance with various regulations without an increase in the length of the vehicles.

U.S. Pat. No. 4,762,352 A (ENOMOTO ET AL) discloses a bumper for a motorcar having a shock absorbing member made of a foamed synthetic resin attached to a front surface of a backup beam connected to left and right stays of a car body. The resultant assembly of those members is covered at its front, upper and lower surfaces with a synthetic resin facing member which is nearly in the form of a channel in section. The backup beam is formed out of fiber-reinforced synthetic resin and is a hollow beam member having depth which is comparatively large at its middle portion extending between the two stays and is comparatively small at its both end portions extending from the two stay connecting portions thereof to the terminal ends thereof. The shock absorbing member is formed so that the change in the depth thereof is in inverse relation to the foregoing change in the depth of the backup beam so that the depth of the entire resultant assembly may nearly constant. The backup beam can be made of a channel-shaped front shell member and a channel-shaped rear shell member which are joined together at their flanges to be formed into a hollow beam. The facing member is connected to rear shell member at a facing member attaching edge. The arrangement of U.S. Pat. No. 4,762,352 A is unable to be adapted so as to allow compliance with various regulations without an increase in the length of the vehicles.

BRIEF SUMMARY

The technology disclosed herein provides a bumper assembly which can be easily adapted so as to allow compliance with various regulations without an increase in the length of the vehicles, while preserving the functionality, low cost, aerodynamic properties and aesthetic appearance of the vehicle.

This and further objects are obtained, according to a first aspect, by a bumper assembly comprising a bumper core. The bumper core, in turn, comprises: a first cross member made of a first thermoplastic material and a first and a second substantially undeformable connection device for rigidly fixing the first cross member to the chassis of the vehicle. The first and the second connection devices are made of a material such that they are not visibly deformed when subject to a pressure of up to 20 N/mm². The first and the second substantially undeformable connection devices co-operate with the first cross member. The bumper core also comprises a second cross member and at least one shock absorbing element arranged between the first cross member and the second cross member. The second cross member is connected to said first and second substantially undeformable connection devices or it is formed as one piece with said substantially undeformable connection devices.

Conveniently, the bumper core also comprises a first and a second crash box, the first substantially undeformable connection device being in contact with the first crash box and the second substantially undeformable connection device being in contact with the second crash box; the second cross member, during use, extends over a distance at least corresponding to that between the first and the second crash box.

The second cross member may be arranged between the chassis of the vehicle and said substantially undeformable connection devices. Alternatively, it may be arranged between the crash boxes and the substantially undeformable connection devices.

According to a second aspect, it is provided a vehicle equipped with a bumper assembly of the type above.

The technology will become completely clear from the detailed description which follows, provided purely by way of a non-limiting example, to be read with reference to the accompanying sheets of illustrative drawings.

BRIEF DESCRIPTION OF THE DRAWINGS

In the drawings:

FIG. 3 is a partially sectioned schematic view of a first example embodiment of a bumper assembly according to a first variant of the technology disclosed herein;

FIG. 3a is a partially cross-sectioned schematic view of the bumper assembly according to FIG. 3, along the centre line;

FIGS. 3b-3e are schematic views of other possible variants of the first embodiment of a bumper assembly according to the invention;

FIG. 4 is a partially sectioned schematic view of a second embodiment of the bumper assembly according to the invention;

FIG. 4a is a cross-sectioned schematic view of the bumper assembly according to FIG. 4, along the centre line;

FIG. 5 is a partially sectioned schematic view of a third example embodiment of the bumper assembly according to the technology disclosed herein;

FIG. 6 is a partially sectioned schematic view of a fourth example embodiment of the bumper assembly according to the technology disclosed herein;

FIG. 7 is a partially sectioned schematic view of a fifth example embodiment of the bumper assembly according to the technology disclosed herein; and FIG. 7a is a cross-sectioned schematic view of a connecting plate of the bumper assembly according to FIG. 7, along the line 7-7.

DETAILED DESCRIPTION

Figure 1:
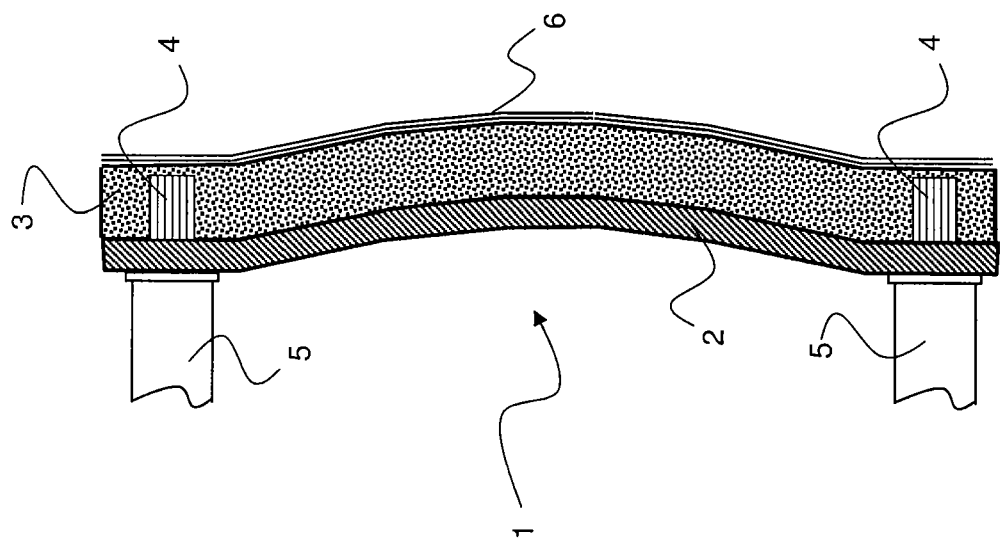
FIG. 1 is a cross-sectioned schematic view of a bumper assembly of the known type.

FIG. 1 is a cross-sectioned schematic view of a bumper assembly of the known type. The assembly 1 comprises a resisting member 2, also called "cross member", and a shock-absorbing element 3 fixed to the outer part of the cross member 2. In some embodiments a pair of crash boxes 4 fixed to the inner part of the cross member 2 is envisaged. Typically, the cross member 2 is made of steel or aluminium, while the shock-absorbing part is made of expanded polypropylene (PPE), expanded polystyrene (PSE), polyurethane or the like. A crash box, otherwise called "sacrificial element", is fixed to the chassis of the vehicle (typically to the longitudinal member 5) and absorbs a significant part of the impact energy, being deformed, but without deformation of the vehicle chassis. Crash boxes are typically honeycomb parts made of metal, such as steel or aluminium. The bumper assembly is then conveniently completed by a bumper shield 6 having primarily aesthetic and aerodynamic functions.

Figure 2:
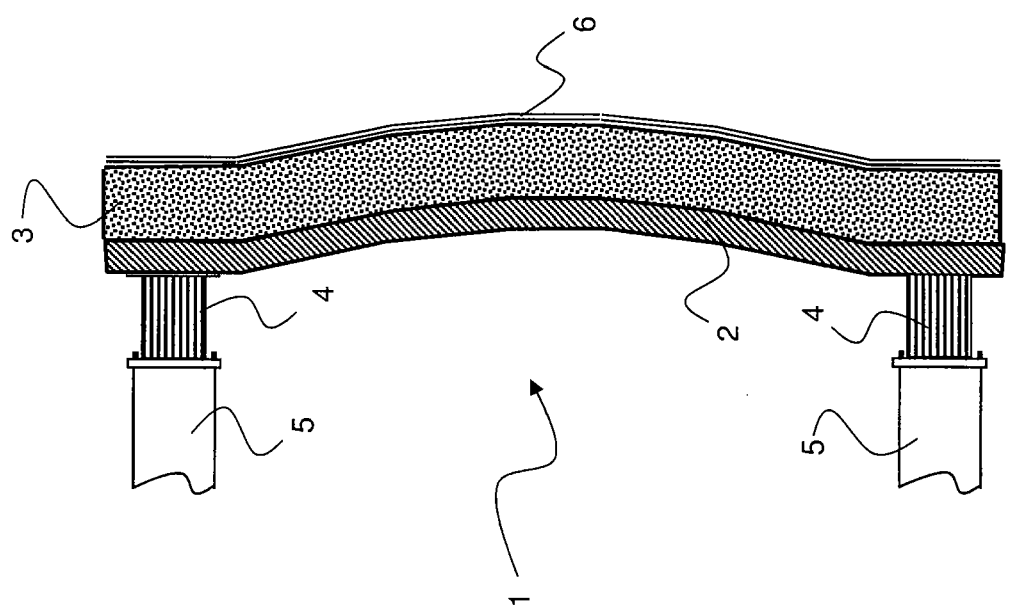
FIG. 2 is a cross-sectioned schematic view of another bumper assembly of the known type.

The known bumper assembly 1 schematically shown in FIG. 2 differs from the bumper assembly according to FIG. 1 in that the crash boxes 4 are embedded in the thickness of the shock-absorbing element 3.

When a known bumper assembly has been designed to pass the crash tests for a pendulum impact stipulated by the present European standards and must be adapted so that it is able to satisfy the corresponding North American regulations mentioned above, usually the thickness of the layer 3 of the shock-absorbing element is increased. This, inevitably, results in the bumper projecting by a greater amount from the shape of the vehicle. The length of the vehicle increases and its form is altered. In turn, this causes modifications to the aerodynamics and the aesthetics of the vehicle.

FIG. 3 is a partially sectioned schematic view of a first embodiment of a bumper assembly 1' according to a first variant of the invention. The bumper assembly 1' comprises a bumper core. It may also comprise a bumper fascia. The bumper core is fixed to the chassis of the vehicle which is shown by means of two longitudinal members 5. The bumper core according to this embodiment comprises at least two crash boxes 10, only one of which has been shown in FIG. 3, at least two respective connecting plates 20, a first cross member 30, a second cross member 60 and a shock-absorbing element 70 between the first and the second cross members. As shown in FIG. 3, the shock-absorbing element 70 is arranged between the first cross member and the second cross member in a length direction of the chassis to absorb energy from a front impact. Conveniently, as said above, the bumper assembly 1' may comprise a bumper fascia or shield 40 which is suitably formed Preferably, the bumper assembly 1' according to the technology disclosed herein also comprises an outer shock-absorbing element 41 which is mounted on the outer part of the first cross member 30 (between the first cross member 30 and the bumper shield 40, where present).

In other example embodiments not shown, if the first cross member 30 has sufficient rigidity characteristics, it is possible to dispense with the crash boxes 10.

According to an example embodiment, the first cross member 30 and, at least partially, the connecting plates 20 are made of a plastic material or the like. For the purpose of the present patent application, the term "plastic material" is understood as meaning primarily a material different from metal and in particular is understood as meaning a substantially thermoplastic material with elongation at break values .gtoreq.50% (for tensile tests performed on test pieces at 5 mm/min.) such as polycarbonate, polyester, polybutylene terephthalate, polypropylene, polyamide and derivatives thereof, polypropylene reinforced with EPDM or the like and any combination thereof. The Applicant has established in particular that a particularly suitable material is XENOY® PC/PBT (alloy of polycarbonate and polybutadiene terephthalate) distributed by GE Plastics. The resin XENOY® is already in use in the motor vehicle sector and ensures optimum resistance to petrol, as well as a high impact strength also at low temperatures, as well as durability over time.

In order to increase the Young's modulus values and the yield strength of the plastic materials used, the technology disclosed herein envisages, where necessary, reinforcing the plastic materials with long or short glass fibres or glass fabrics.

As used herein, the terms "substantially undeformable" and "substantially rigid" are understood as being equivalent. When used in order to qualify a certain component, it means that this component does not result in visible deformation when subjected to a pressure of up to 20 N/mm$^2$.

According to an example embodiment of the technology disclosed herein, each of the crash boxes 10 has a honeycomb cross-section and comprises substantially a plurality of elongated elements with a hexagonal cross-section joined together to form a body of the parallelepiped type, the cross-section of which substantially corresponds to the combination of the plurality of hexagonal sections.

According to an example embodiment of the technology disclosed herein, the crash boxes 10 and the respective connecting plate 20 are made as one piece or are joined together by means of hot-blade welding or a similar joining process.

It will be understood, however, that the crash box 10 may also be made of a metallic material and not necessarily a plastic material, and may have a form different from that described and illustrated.

According to a further example embodiment of the technology disclosed herein, the crash box 10 and the cross member 30 are made as one piece or are joined together by means of hot-blade welding or a similar joining process.

The first cross member 30, which is made of plastic material, as mentioned above, is formed longitudinally in any manner depending on the requirements and the space available in the vehicle on which it will be mounted. As regards its cross-section, it may be equally well box-shaped or open, for example substantially in the form of an "Ω" (omega). The first cross member 30 has preferably a thickness of between about 2 and 8 mm, preferably between about 3 and 6 mm, and even more preferably of about 4 mm. For the purposes of increasing the rigidity of the cross member 30, internal partitions which are suitably spaced from each other may be provided.

Each connecting plate 20 comprises a body which is solid or has a honey-comb cross-section, substantially rigid with a first inner side 25 directly facing the end of the longitudinal member 5 of the vehicle and an outer side 26 co-operating with the crash box 10. Depending on the geometry of the longitudinal member 5, vehicle and bumper assembly, the two sides 25, 26 may not be parallel. The connecting plates 20 are fastened together integrally to the ends of the longitudinal members 5 by means of any mechanical fastening device, for example by means of screws and bolts. Preferably, the connecting plates have a thickness of between about 10 mm and 100 mm, more preferably between 15 mm and 50 mm.

Conveniently, according to the technology disclosed herein, the first cross member 30 and the connecting plates 20 are made of the same material or a compatible material which allows them to be joined together in a simple, low-cost and reliable manner. Preferably, cross member and connecting plate are made of a plastic material, in particular XENOY®. In this case, the cross member and the fixing plates are joined together by means of welding, preferably hot-blade welding.

According to the technology disclosed herein, therefore, since the connecting plates 20 are substantially rigid, the cross member 30 is directly fastened to the longitudinal members 5 of the vehicle and provides better impact strength properties than the existing solutions.

Conveniently, as mentioned above, the first cross member 30 has a cross-section substantially in the form of an "Ω" (omega) and the crash boxes 10 are housed inside the first cross member 30, i.e. inside its hollow part (FIG. 4). The crash boxes may be made of metal or plastic, the latter material being preferred. The crash boxes 10 could be fastened to the first cross member 30 by means of a forced fit, pressure or in any other way. If necessary, they could also simply be centred. In an even more preferred solution, the crash boxes 10 are integral with the first cross member 30 and are obtained by means of moulding of the latter or united by means of hot-blade welding.

Conveniently, the bumper assembly 1' according to the technology disclosed herein comprises a shock-absorbing element 41 applied to the outer side of the cross member, this element comprising a foam-type material, for example expanded polypropylene, expanded polyurethane, expanded polystyrene and derivatives thereof. Alternatively, the outer cushioning element 41 comprises a honeycomb thermoplastic cushioning part.

According to the technology disclosed herein, the bumper assembly 1' comprises a second cross member 60 and at least one shock-absorbing element 70 between the first cross member 30 and the second cross member 60.

The second cross member 60 extends between the first and the second longitudinal members 5. The second cross member has two shaped ends 61. According to the first embodiment (FIG. 3), each of the shaped ends 61 is able to engage with a respective connecting plate 20.

The second cross member 60 may be made of a metallic material (typically steel or aluminium). More conveniently, it is made of a plastic material so that it may be joined to the connecting plates by means of welding. It is formed longitudinally in any way depending on the requirements and on the space available in the vehicle on which it will be mounted. As regards its cross-section, it may be equally well box-shaped or open, for example substantially in the form of an "Ω" (omega). The second cross member 60 has preferably a thickness of between about 2 and 8 mm, preferably between about 3 and 6 mm and even more preferably of about 4 mm. In order to increase the rigidity of the second cross member 60 internal partitions suitably spaced from each other may be provided.

As mentioned above and as illustrated in the various FIGS. 3, 3b, 3c, 3d and 3e, at least one shock-absorbing element 70 is provided between the first cross member 30 and the second cross member 60. For the sake of clarity, in FIGS. 3b-3e the first cross member, the outer shock-absorbing element and the bumper shield have not been shown.

Conveniently, the at least one shock-absorbing element 70 comprises a first more external portion 71 and a second more internal portion 72. The second portion 72 is substantially rigid. The first portion 71 has, instead, good resilience properties (for this reason it is called a "resilient portion") as well as compressive properties when subjected to pressure. As used herein, a part is made of resilient material if, when this part is subjected to a compressive force which reduces its height by 75%, it returns to about 10% less than its original height when no longer subjected to pressure.

The second portion 72 may be made of moulded polypropylene, steel, aluminium or wood.

Other embodiments may be envisaged. For example, the first resilient portion or the second rigid portion could be dispensed with. As a further alternative, the second portion 72 can be formed as a single body with the second cross member 60.

The first portion 71 may be conveniently made of expanded polypropylene with a variable density depending on the desired shock-absorbing properties. In any case, the density of the polypropylene is conveniently between 30 g/l and 180 g/l.

Figure 3E:
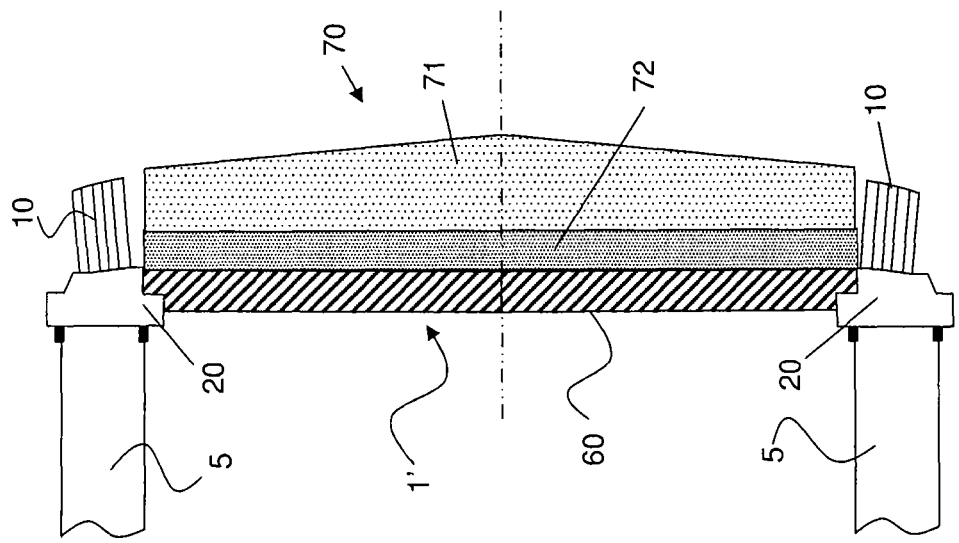
Figure 3D:
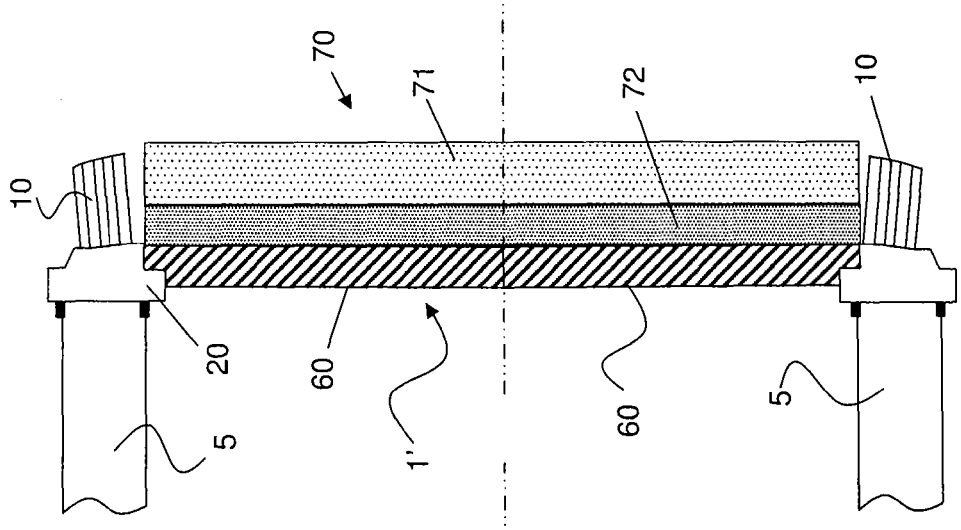
Figure 3C:
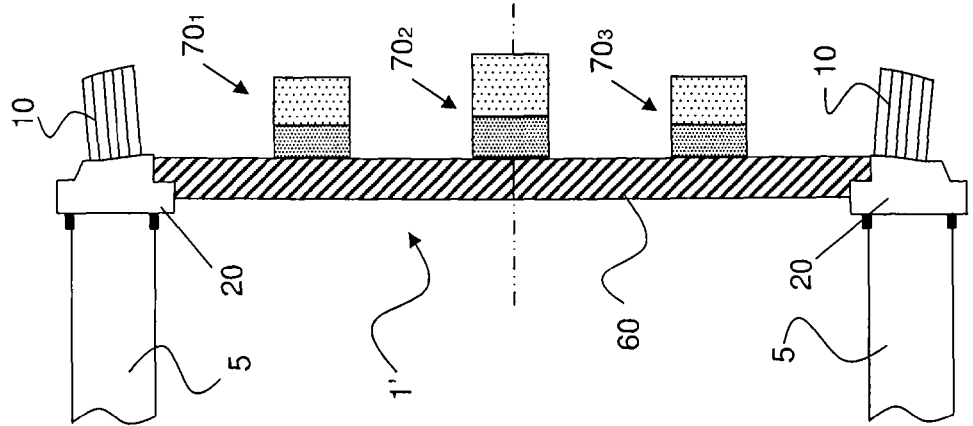
Figure 8:
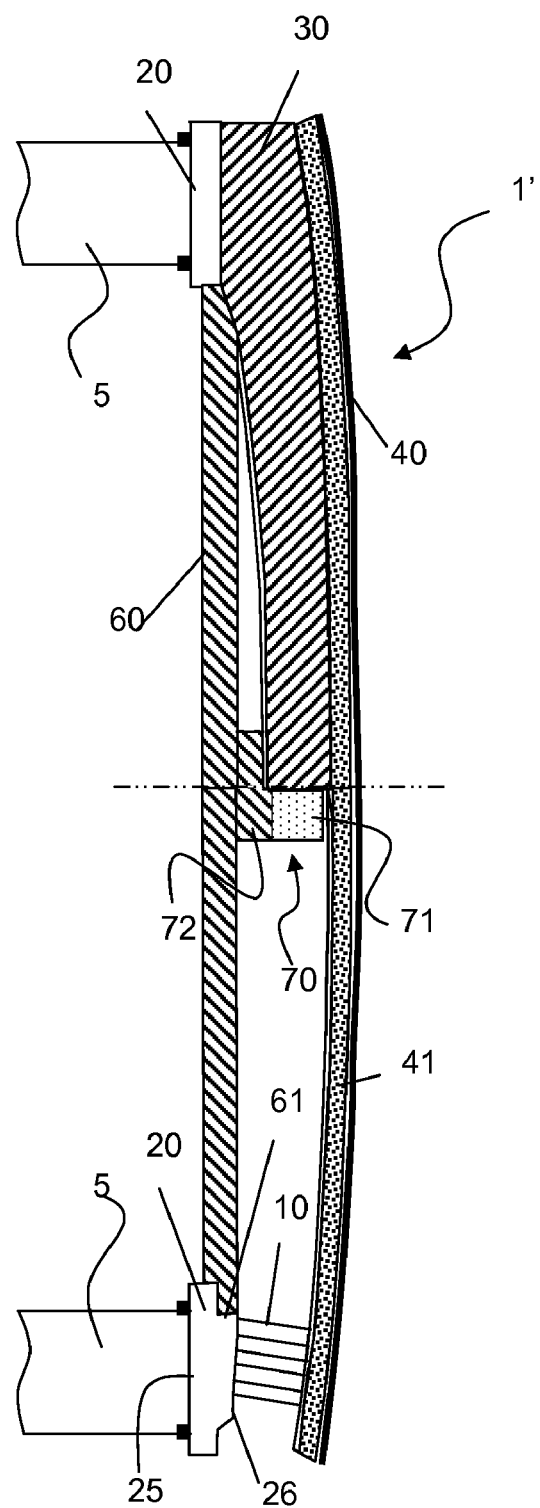
FIG. 8 is a partially cross-sectioned schematic view of another embodiment of a bumper assembly according to the technology disclosed herein.

In FIG. 3 there is only one shock-absorbing element 70 in a central position. According to a first variant (FIG. 3b) there are several shock-absorbing elements which are substantially the same (namely which all have the same overall dimensions and where the resilient portion has the same size in all the shock-absorbing elements). For example there may be three shock-absorbing elements, a central one ($70_2$) and two side ones ($70_1$, $70_3$). The shock-absorbing elements may also not be identical to each other (FIG. 3c). For example, the central shock-absorbing element $70_2$ could have dimensions and/or characteristics different from those of the side shock-absorbing element $70_1$, $70_3$. FIG. 3d shows another variant in which the shock-absorbing element 70 extends uniformly along the entire length of the second cross member 60. In FIG. 3e the shock-absorbing element 70 does not extend uniformly along the entire length of the second cross member 60. In fact, the resilient portion has a thickness greater in the centre than on the sides.

The shock-absorbing element arranged between the first and the second cross member may be fixed to the second cross member 60, to the first cross member 30 or to both the cross members.

Second Embodiment

FIG. 4 is a sectioned schematic view of a second example embodiment of the bumper assembly according to the technology disclosed herein. The difference between the first and the second embodiments consists in the fact that the second cross member 60 is arranged between the vehicle chassis (typically the longitudinal members 5) and the connecting plates 20. Conveniently, the ends of the second cross member 60 are flattened or in any case tapered. In order to reduce the overall dimensions, the connecting plates may have a smaller thickness than the plates of the first embodiment so as to compensate for the greater volume which would exist by arranging the second cross member in between.

The second cross member 60 of this embodiment may be fixed to the vehicle chassis and/or to the connecting plates in any suitable manner, for example by means of screws and bolts.

The cross-sectional form of the second cross member 60 of this embodiment may be like that of the first embodiment, and a detailed description will therefore not be repeated.

The material of the second cross member of this embodiment also may be the same as that of the first embodiment.

Moreover, all the comments made in connection with the shock-absorbing element 70 arranged between the first and the second cross members 30, 60 are likewise applicable also to the shock-absorbing element of this embodiment.

Third Embodiment

FIG. 5 is a cross-sectioned schematic view of a third example embodiment of the bumper assembly according to the technology disclosed herein. The difference between the first and the third embodiment consists in the fact that the second cross member 60 is arranged between the connecting plates 20 and the respective crash boxes 10. Conveniently the ends of the second cross member 60 are flattened or in any case tapered. In order to reduce the overall dimensions, the connecting plates may have a smaller thickness than the plates of the first embodiment, so as to compensate for the greater volume which would exist with the arrangement of the second cross member in between.

The second cross member 60 of this embodiment may be fixed to the connecting plates and/or to the crash boxes in any suitable manner, for example by means of screws and bolts.

The cross-sectional form of the second cross member 60 of this embodiment may be like that of the first embodiment, and a detailed description will therefore not be repeated.

The material of the second cross member of this embodiment also may be the same as that of the first embodiment.

Moreover, all the comments made in connection with the shock-absorbing element 70 arranged between the first and the second cross members 30, 60 are likewise applicable also to the shock-absorbing element of this embodiment.

Fourth Embodiment

FIG. 6 is a cross-sectioned schematic view of a fourth example embodiment of the bumper assembly according to the technology disclosed herein. The difference between the first and the fourth embodiment consists in the fact that the second cross member 60 is formed as one piece with the connecting plates 20.

The cross-sectional form of the second cross member of this embodiment (except in the end part where it assumes the plate form) may be like that of the first embodiment, and a detailed description will therefore not be repeated.

The material of the second cross member of this embodiment may also be the same as that of the first embodiment. Conveniently, it will be a plastic material.

Moreover, all the comments made in connection with the shock-absorbing element arranged between the first and the second cross members 30, 60 are likewise applicable to the shock-absorbing element of this embodiment.

Fifth Embodiment

FIG. 7 is a cross-sectional schematic view of a fifth example embodiment of the bumper assembly according to the technology disclosed herein. The difference between the first and the fifth embodiment consists in the fact that two ends of the second cross member 60 are inserted in respective cavities formed in the thickness of the connecting plates 20, as is clear from FIG. 7a which is a cross-section along the line 7-7 of FIG. 7. Conveniently, the ends of the second cross member 60 are flattened or in any case tapered. This solution is advantageous because the thickness of the connecting plates is not increased in any way.

The second cross member 60 of this embodiment may be fixed to the connecting plates in any suitable manner, for example by means of screws and bolts. Alternatively, the ends of the second cross member 60 may be simply inserted into the respective cavities. The cavities may be of the through type or blind.

The cross-sectional form of the second cross member 60 of this embodiment may be like that of the first embodiment (except for the ends which must be necessarily flattened or tapered), and a detailed description will therefore not be repeated.

The material of the second cross member of this embodiment may also be the same as that of the first embodiment.

Moreover, all the comments made in connection with the shock-absorbing element 70 arranged between the first and second cross members 30, 60 are likewise applicable to the shock-absorbing element of this embodiment.

As mentioned above, conveniently, the shock-absorbing element 70 between the first cross member 30 and the second cross member 60 comprises a first outer resilient portion 71 and a second inner (substantially rigid) portion 72. The length or thickness of the outer portion 71 depends on the geometry of the car and in particular on the so-called "intrusion distance". The intrusion distance is defined as the difference between a first distance and a second distance, both measured along the axis of the impact. The first distance is the distance between the centre of gravity of the vehicle and the end of the impacting element immediately before impact with the vehicle. The second distance is the distance between the centre of gravity of the vehicle and the end of the impacting element after the impact, at the instant when separation between the impacting element and the vehicle occurs. Conventionally, the instant of separation is the instant when the speed of the impacting element is equal to the speed of the vehicle (during the impact, the impacting element reduces speed, while the vehicle increases its speed).

According to a first alternative, the length or thickness of the outer portion 71 is equal to at least the intrusion distance.

Preferably the thickness of the outer portion 71 is greater than the intrusion distance. More preferably, the thickness of the outer portion 71 is about 1.3 times the intrusion distance.

As will now become clear from the description above, in order to pass less severe crash tests, it is sufficient to provide a bumper assembly with connecting plates 20 and cross member 30 (and, if necessary, with crash boxes 10, outer shock-absorbing element and bumper shield). In order to pass more severe crash tests, the bumper assembly of the abovementioned type must be completed by the second cross member 60 and by the inner shock-absorbing element 70, arranged between the two cross members 30, 60.

During the impact, the forces due to the role of the first cross member are added to the forces due to the role of the second cross member.

The embodiments of the bumper assembly according to the technology disclosed herein may be subject to numerous modifications, adaptations, variations and replacement of parts with other functionally equivalent parts, but that these modifications, adaptations, variations and replacement of parts are to be understood as falling within the scope of the technology disclosed herein.

It should be remarked that, thanks to the fact that the second cross member is connected to the substantially undeformable connection devices or it is formed as one piece with such substantially undeformable connection devices, the bumper core of the technology disclosed herein allows to resist to well higher crashes than in the prior art. In fact, in the arrangements of the prior art, it was provided just a single cross member and a bumper fascia. The latter, in the prior art arrangements, is connected to the cross member and/or to the vehicle shell which is unable to absorb crash energy higher than about 300 Joule. On the contrary, in the technology disclosed herein there is provided a substantially rigid connection between the second cross member and the vehicle chassis due to the fact that the second cross member is connected to the substantially rigid connection devices 20 which, in turn, are connected to the chassis. In the arrangement of the technology disclosed herein, crash energy up to about 2000 or 3000 Joule is taken by the vehicle chassis (column rails or the like).

Any type of connection between the second cross member and the connection devices 20 can be provided. For example, they could be connected together by screw members, welding, glue/adhesive or the like. In one example embodiment, the substantially rigid connection devices 20 are formed as one piece with the second cross members. It should be understood that the expression "the second cross member is connected to the first and second substantially undeformable connection devices" also include the embodiment wherein the two ends of the second cross member are received into proper cavities of the substantially undeformable connection devices.

According to the technology disclosed herein, it is preferable not to connect the first and second cross members other than in the end areas, where they are connected to substantially rigid connection devices.

We claim:

1. A bumper assembly for a vehicle, the vehicle comprising a chassis, the bumper assembly comprising a bumper core, wherein said bumper core comprises:

a first cross member comprising a first thermoplastic material;

a first substantially undeformable connection device; and a second substantially undeformable connection device, wherein said first and second substantially undeformable connection devices are configured to rigidly fix said first cross member to the chassis of the vehicle,
wherein said first and the second substantially undeformable connection devices co-operate with said first cross member;
a second cross member and at least one shock-absorbing element which is arranged between said first cross member and said second cross member, wherein said second cross member is connected to said first and second substantially undeformable connection devices or is formed as one piece with said first and second substantially undeformable connection devices,
a first and a second crash box, the first substantially undeformable connection device being in contact with said first crash box and the second substantially undeformable connection device being in contact with said second crash box, said second cross member, during use, extending over a distance at least corresponding to that between the first and the second crash boxes,
wherein said second cross member is arranged between the crash boxes,
wherein said second cross member is arranged between the crash boxes and said first and second substantially undeformable connection devices; and
wherein the at least one shock-absorbing element is arranged between the first cross member and the second cross member in a length direction of the chassis to absorb energy from a front impact, the at least one shock-absorbing element being in contact with the first cross member and the second cross member; and
wherein said shock-absorbing element comprises a first portion and a second portion, the first portion being resilient and the second portion being substantially rigid, and wherein length or thickness of the first portion is dependent upon an intrusion distance of the vehicle.

2. A bumper assembly for a vehicle, the vehicle comprising a chassis, the bumper assembly comprising a bumper core, wherein said bumper core comprises:
a first cross member comprising a first thermoplastic material:
a first substantially undeformable connection device; and
a second substantially undeformable connection device,
wherein said first and second substantially undeformable connection devices are configured to rigidly fix said first cross member to the chassis of the vehicle,
wherein said first and the second substantially undeformable connection devices co-operate with said first cross member;
a second cross member and at least one shock-absorbing element which is arranged between said first cross member and said second cross member, wherein said second cross member is connected to said first and second substantially undeformable connection devices or is formed as one piece with said first and second substantially undeformable connection devices,
a first and a second crash box, the first substantially undeformable connection device being in contact with said first crash box and the second substantially undeformable connection device being in contact with said second crash box, said second cross member, during use, extending over a distance at least corresponding to that between the first and the second crash boxes,
wherein said second cross member is arranged between the crash boxes, and
wherein said shock-absorbing element comprises at least one portion thereof which is substantially undeformable; and
wherein the at least one shock-absorbing element is arranged between the first cross member and the second cross member in a length direction of the chassis to absorb energy from a front impact, the at least one shock-absorbing element being in contact with the first cross member and the second cross member.

3. A bumper assembly for a vehicle, the vehicle comprising a chassis, the bumper assembly comprising a bumper core, wherein said bumper core comprises:
a first cross member comprising a first thermoplastic material;
a first substantially undeformable connection device; and
a second substantially undeformable connection device,
wherein said first and second substantially undeformable connection devices are configured to rigidly fix said first cross member to the chassis of the vehicle,
wherein said first and the second substantially undeformable connection devices co-operate with said first cross member;
a second cross member and at least one shock-absorbing element which is arranged between said first cross member and said second cross member, wherein said second cross member is connected to said first and second substantially undeformable connection devices or is formed as one piece with said first and second substantially undeformable connection devices,
a first and a second crash box, the first substantially undeformable connection device being in contact with said first crash box and the second substantially undeformable connection device being in contact with said second crash box, said second cross member, during use, extending over a distance at least corresponding to that between the first and the second crash boxes,
wherein said second cross member is arranged between the crash boxes, and
wherein said shock-absorbing element comprises at least one portion thereof with resilience properties; and
wherein the at least one shock-absorbing element is arranged between the first cross member and the second cross member in a length direction of the chassis to absorb energy from a front impact, the at least one shock-absorbing element being in contact with the first cross member and the second cross member; and
wherein said shock-absorbing element comprises the portion with resilience properties and a substantially rigid portion, and wherein length or thickness of the portion with resilience properties is dependent upon an intrusion distance of the vehicle.

4. A bumper assembly for a vehicle, the vehicle comprising a chassis, the bumper assembly comprising a bumper core, wherein said bumper core comprises:
a first cross member comprising a first thermoplastic material;
a first substantially undeformable connection device; and
a second substantially undeformable connection device,
wherein said first and second substantially undeformable connection devices are configured to rigidly fix said first cross member to the chassis of the vehicle,
wherein said first and the second substantially undeformable connection devices co-operate with said first cross member;
a second cross member and at least one shock-absorbing element which is arranged between said first cross member and said second cross member in a length direction of the chassis to absorb energy from a front impact, wherein said second cross member is connected to said first and second substantially undeformable connection devices or is formed as one piece with said first and second substantially undeformable connection devices, a first and a second crash box, the first substantially undeformable connection device being in contact with said first crash box and the second substantially undeformable connection device being in contact with said second crash box, said second cross member, during use, extending over a distance at least corresponding to that between the first and the second crash boxes, wherein said second cross member is arranged between the crash boxes, and wherein said shock-absorbing element comprises a first portion and a second portion, wherein said first portion of said shock-absorbing element is resilient and in contact with said first cross member and wherein said second portion of said shock-absorbing element is made as one piece with said second cross member; and wherein the second portion is substantially undeformable.

5. The bumper assembly of claim 1, wherein said first and the second connection devices are made of a material such that they are not visibly deformed when subject to a pressure of up to 20 N/mm$^2$.

6. The bumper assembly of claim 2, wherein said first and the second connection devices are made of a material such that they are not visibly deformed when subject to a pressure of up to 20 N/mm$^2$.

7. The bumper assembly of claim 3, wherein said first and the second connection devices are made of a material such that they are not visibly deformed when subject to a pressure of up to 20 N/mm$^2$.

8. The bumper assembly of claim 4, wherein said first and the second connection devices are made of a material such that they are not visibly deformed when subject to a pressure of up to 20 N/mm$^2$.

9. The bumper assembly of claim 1, wherein each of the connection devices comprises a connection plate, wherein the connection plate is solid or has a honey-comb cross section, and wherein the connection plate has a thickness between about 10 mm and about 100 mm.

10. The bumper assembly of claim 2, wherein each of the connection devices comprises a connection plate, wherein the connection plate is solid or has a honey-comb cross section, and wherein the connection plate has a thickness between about 10 mm and about 100 mm.

11. The bumper assembly of claim 3, wherein each of the connection devices comprises a connection plate, wherein the connection plate is solid or has a honey-comb cross section, and wherein the connection plate has a thickness between about 10 mm and about 100 mm.

12. The bumper assembly of claim 4, wherein each of the connection devices comprises a connection plate, wherein the connection plate is solid or has a honey-comb cross section, and wherein the connection plate has a thickness between about 10 mm and about 100 mm.

13. The bumper assembly of claim 1, wherein the second cross member is either made of a plastic material or is made of metal and is connected to the connecting plates by welding.

14. The bumper assembly of claim 2, wherein the second cross member is either made of a plastic material or is made of metal and is connected to the connecting plates by welding.

15. The bumper assembly of claim 3, wherein the second cross member is either made of a plastic material or is made of metal and is connected to the connecting plates by welding.

16. The bumper assembly of claim 4, wherein the second cross member is either made of a plastic material or is made of metal and is connected to the connecting plates by welding.

17. The bumper assembly of claim 2, wherein the at least one shock-absorbing element comprises a first portion and a second portion, wherein said second portion of the at least one shock-absorbing element is substantially rigid.

18. The bumper assembly of claim 2, wherein said shock-absorbing element comprises the substantially undeformable portion and a resilient portion, and wherein length or thickness of the resilient portion is dependent upon an intrusion distance of the vehicle.

19. The bumper assembly of claim 4, wherein length or thickness of the first portion is dependent upon an intrusion distance of the vehicle.

20. The bumper assembly of claim 1, wherein said shock-absorbing element comprises a foam-type material comprising at least one of expanded polypropylene, expanded polyurethane, expanded polystyrene, and derivatives thereof.

21. The bumper assembly of claim 2, wherein said shock-absorbing element comprises a foam-type material comprising at least one of expanded polypropylene, expanded polyurethane, expanded polystyrene, and derivatives thereof.

22. The bumper assembly of claim 3, wherein said shock-absorbing element comprises a foam-type material comprising at least one of expanded polypropylene, expanded polyurethane, expanded polystyrene, and derivatives thereof.

23. The bumper assembly of claim 4, wherein said shock-absorbing element comprises a foam-type material comprising at least one of expanded polypropylene, expanded polyurethane, expanded polystyrene, and derivatives thereof.

* * * * *